Jan. 5, 1960  A. D. COLE ET AL  2,920,283

PULSE MEASURING SYSTEM

Filed April 24, 1958

LEGEND:
A— PULSES UNDER TEST
B— REFERENCE SIGNAL
C— OUTPUT FROM
   INTEGRATOR 7
D— OUTPUT FROM
   INTEGRATOR 8
E— INTEGRATOR OUTPUT
   DELAYED
F—    D AND E
   DIFFERENTIALLY
   COMBIND

INVENTORS
ADDISON D. COLE
ROY G. HEATON
MAURICE A. MEYER
BY
ATTORNEYS

United States Patent Office 2,920,283
Patented Jan. 5, 1960

2,920,283

PULSE MEASURING SYSTEM

Addison D. Cole, Roy G. Heaton, and Maurice A. Meyer, Natick, Mass., assignors to the United States of America as represented by the Secretary of the Air Force Application April 24, 1958, Serial No. 730,728

5 Claims. (Cl. 331—12)

This invention relates to a pulse jitter measuring system and more particularly to a system which provides a signal output characteristic of the degree of pulse jitter of a source under test.

In radar systems such as MTI which includes a component such as an externally pulsed or locked oscillator, jitter of the pulses imposes a limitation on the effectiveness of the system. The jitter factor is very important, therefore, it is highly desirable to provide a signal output characteristic of the degree of jitter.

In accordance with the present invention, a novel system for measurement of jitter in a pulse is provided. It is comprised of a pair of gating circuits, each one adapted to receive a signal. The signal for the first being the pulse under test, the signal for the second being the inverted form of the pulse. Each of the gating circuits also have a second input which is supplied with a common reference signal. The first gating circuit will produce an output signal when both its inputs are positive, the second gating circuit will provide an output when both its inputs are negative. Both output signals are then integrated and one is time-delayed for one-half the period of the pulse under test. The delayed integrated signal and the undelayed integrated signal are combined differentially. The combined signal is utilized to control the frequency of the reference signal. The combined signal is also a measure of the amount of jitter that is present in the pulse being tested.

An object of the present invention is to provide a novel system to produce a signal output characteristic of the degree of pulse jitter of a source under test.

Another object of the present invention is to provide a novel system to generate a signal output characteristic of the degree of pulse jitter of a source under test by comprising the output pulse of the source under test with a reference signal wherein the frequency of the reference signal is controlled by the signal output of the system.

Figure 1:
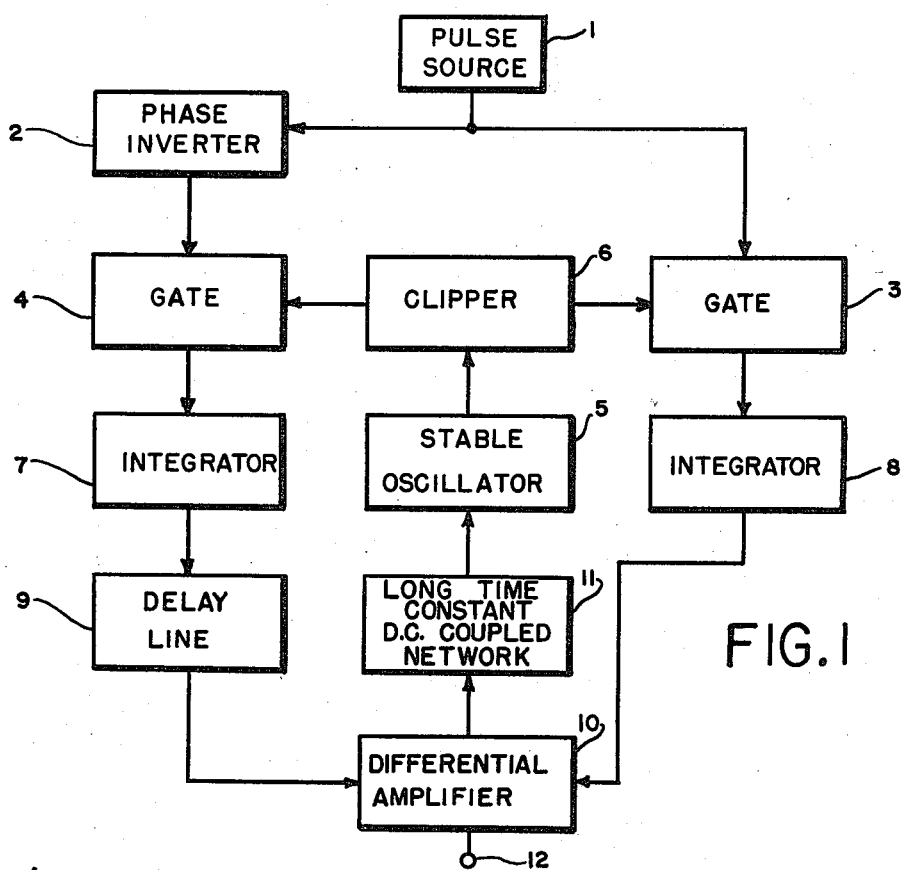
Figure 2:
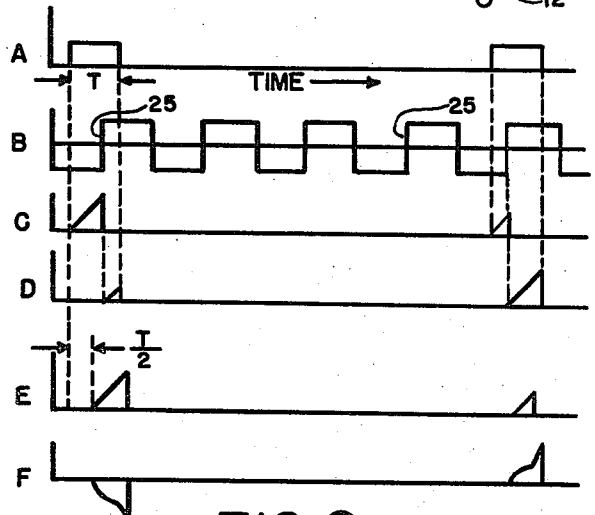

Further objects, features and advantages of the present invention will suggest themselves to those skilled in the art and will become apparent from the following description of the invention taken in connection with the accompanying drawings in which:

Referring to Fig. 1, the system is illustrated in block diagram form, pertinent waveforms thereof being shown in Fig. 2. Pulse source 1, under test, energizes gate 3 directly and gate 4 through phase inverter 2 with pulses as shown in Fig. 2(A). They are energized by a reference signal Fig. 2(B) derived from stable oscillator 5 through clipper 6. Integrator 7 is operative when both input signals to gate 4 are negative, generating signals of Fig. 2(C). Integrator 8 is operative when both the test pulse and reference signal applied to gate 3 are positive. Hence, for the duration of the test pulse, one integrator is operative. Delay line 9 delays the signal output of integrator 7, preferably for one-half the test pulse duration. The delayed signal is differentially combined with the signal from integrator 8 in differential amplifier 10 to provide the signal output of Fig. 2(F) on terminal 12, which is characteristic of the degree of jitter of the pulses under test.

This signal output present at terminal 12 is also applied through network 11, which is effectively at low pass filter, to a variable reactance control element of stable oscillator 5 to control the frequency thereof to be a harmonic of the test pulse PRF, the long time constant of network 11 being effective in preventing oscillator 5 from responding to the pulse jitter.

When there is no pulse jitter and the reference signal is locked on the appropriate PRF harmonic, the pulses under test are centered about a time coincident with a reference signal crossover 25 as shown in Fig. 2(B). The output from integrator 8 and from integrator 7 delayed T/2 are substantially identical; thus, when differentially combined in amplifier 10 the signal on terminal 12 is substantially zero.

This arrangement provides sensitive means for accurately measuring pulse jitter over a wide range of PRF, effecting the long term frequency of the stable oscillator, while the oscillator frequency is utilized to measure the short term jitter stability of said pulses.

While there has been described what is at present considered to be the preferred embodiment of the invention, it will be obvious to those skilled in the art that various changes and modifications may be made therein wtihout departing from the spirit and scope of the invention.

The invention claimed is:

1. In a system for measuring pulse jitter, means for inverting said pulse under test, means for generating a common reference pulse so positioned as to be centered at the trailing edge of said test and said inverted pulse, a first gating means controlled by said common reference pulse and said inverted pulse so as to provide an output signal when both its control signals are negative, a second gating means controlled by said common reference pulse and said test pulse so as to provide an output signal when both its central signals are positive, a pair of means to integrate the output signals of said first and second gating means, means to delay said integrated signal provided by the way of said first gating means, means to differentially amplify said delayed integrated signal and said integrated signal provided by way of said second gating means, and means to control the frequency of said reference generator utilizing said differentially amplified signal.

2. In a system for measuring pulse jitter, means for generating an inverted pulse from said pulse under test, means for generating a common reference pulse so positioned as to be centered at the trailing edge of said test and said inverted pulse, means to integrate said inverted pulse and said test pulse, said integrating means energized by said common reference pulse, means to delay said integrated signal of said inverted pulse, means to differentially compare said delayed integrated signal and said other integrated signal, and means to control the frequency of said reference pulse generator by utilizing said differentially compared signal.

3. In a system for measuring pulse jitter, means for inverting said pulse under test, means to generate a reference pulse at a harmonic of the repetition frequency of said test pulse and so positioned that said reference pulse is centered at the trailing edge of said test and inverted pulse, first gating means energized by said inverted pulse and said reference pulse when both are of negative polarity to produce a pulse output, second gating means energized by said test pulse and said reference pulse when both are of positive polarity to produce a pulse output, first integrating means for said pulse output of said first gating means, second integrating means for said pulse output of said second gating means, means to delay said integrated signal from said first integrating means, means to differentially amplify said delayed integrated signal and said integrated signal produced by said second integrating means, and means to control the frequency of said reference generator utilizing said differentially amplified signal.

4. In a system for measuring pulse jitter as described in claim 3 wherein said control means is comprised of a long time constant direct current coupled network receiving said differentially amplified signal, said direct current coupled network being interposed between said differential amplifier and said reference pulse generator.

5. In a system for measuring pulse jitter, first gating means, including two inputs, one of said inputs energized through a phase inverted by said test pulse, second gating means, including two inputs, one of said inputs energized directly by said test pulse, means to generate a common reference pulse, said reference pulse energizing each of the other inputs of said first and second gating means, first integrator means operative when both said input signals to said first gating means are negative, second integrator means operative when both of said input signals to said second gating means are positive, means to delay the signal output of said first integrator, means to differentially combine said delayed integrated signal and said integrated signal from said second integrating means, and means to control the frequency of said reference pulse generator by utilizing said differentially amplified signal.

References Cited in the file of this patent

UNITED STATES PATENTS

| | | |
|---|---|---|
| 2,689,914 | Keen | Sept. 21, 1954 |
| 2,807,015 | Shank | Sept. 17, 1957 |